United States Patent
Asumi

(10) Patent No.: US 11,310,381 B2
(45) Date of Patent: Apr. 19, 2022

(54) IMAGE FORMING APPARATUS AND NON-TRANSITORY COMPUTER READABLE MEDIUM FOR EJECTING FIRST SHEET WITH EVALUATION RESULT AND SECOND SHEET WITH INFORMATION BASED ON FIRST SHEET

(71) Applicant: FUJIFILM BUSINESS INNOVATION CORP., Tokyo (JP)

(72) Inventor: Taishi Asumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/021,382

(22) Filed: Sep. 15, 2020

(65) Prior Publication Data
US 2021/0250456 A1    Aug. 12, 2021

(30) Foreign Application Priority Data
Feb. 6, 2020 (JP) .............................. JP2020-018912

(51) Int. Cl.
*G06F 3/12* (2006.01)
*H04N 1/00* (2006.01)

(52) U.S. Cl.
CPC ..... *H04N 1/00631* (2013.01); *H04N 1/00639* (2013.01); *H04N 1/00649* (2013.01)

(58) Field of Classification Search
CPC .......... H04N 1/00631; H04N 1/00639; H04N 1/00649
USPC .................................................. 358/1.1–1.18
See application file for complete search history.

(56) References Cited

U.S. PATENT DOCUMENTS

| | | | |
|---|---|---|---|
| 2007/0160971 A1* | 7/2007 | Caldera .................... | G09B 7/00 434/353 |
| 2014/0093858 A1* | 4/2014 | Caruthers, Jr. .......... | G09B 7/02 434/362 |
| 2015/0064683 A1* | 3/2015 | Rajagopalan ............ | G09B 7/06 434/359 |
| 2019/0272769 A1* | 9/2019 | Yasuoka ................... | G09B 7/04 |
| 2021/0118316 A1* | 4/2021 | Enomoto ................. | G09B 7/02 |

FOREIGN PATENT DOCUMENTS

| | | |
|---|---|---|
| JP | 2018-106082 A | 7/2018 |
| JP | 2019-23673 A | 2/2019 |

* cited by examiner

*Primary Examiner* — Gabriel I Garcia
(74) *Attorney, Agent, or Firm* — Oliff PLC

(57) ABSTRACT

An image forming apparatus includes a reader, a wait part, and a processor. The reader reads an image from a first sheet. In the wait part, the first sheet is made to wait. The processor is configured to make the first sheet wait in the wait part after the reading performed by the reader, and, after the first sheet is made to wait in the wait part, output the first sheet and a second sheet continuously. The second sheet records first information determined on the basis of an evaluation result obtained from evaluation of the first sheet.

11 Claims, 11 Drawing Sheets

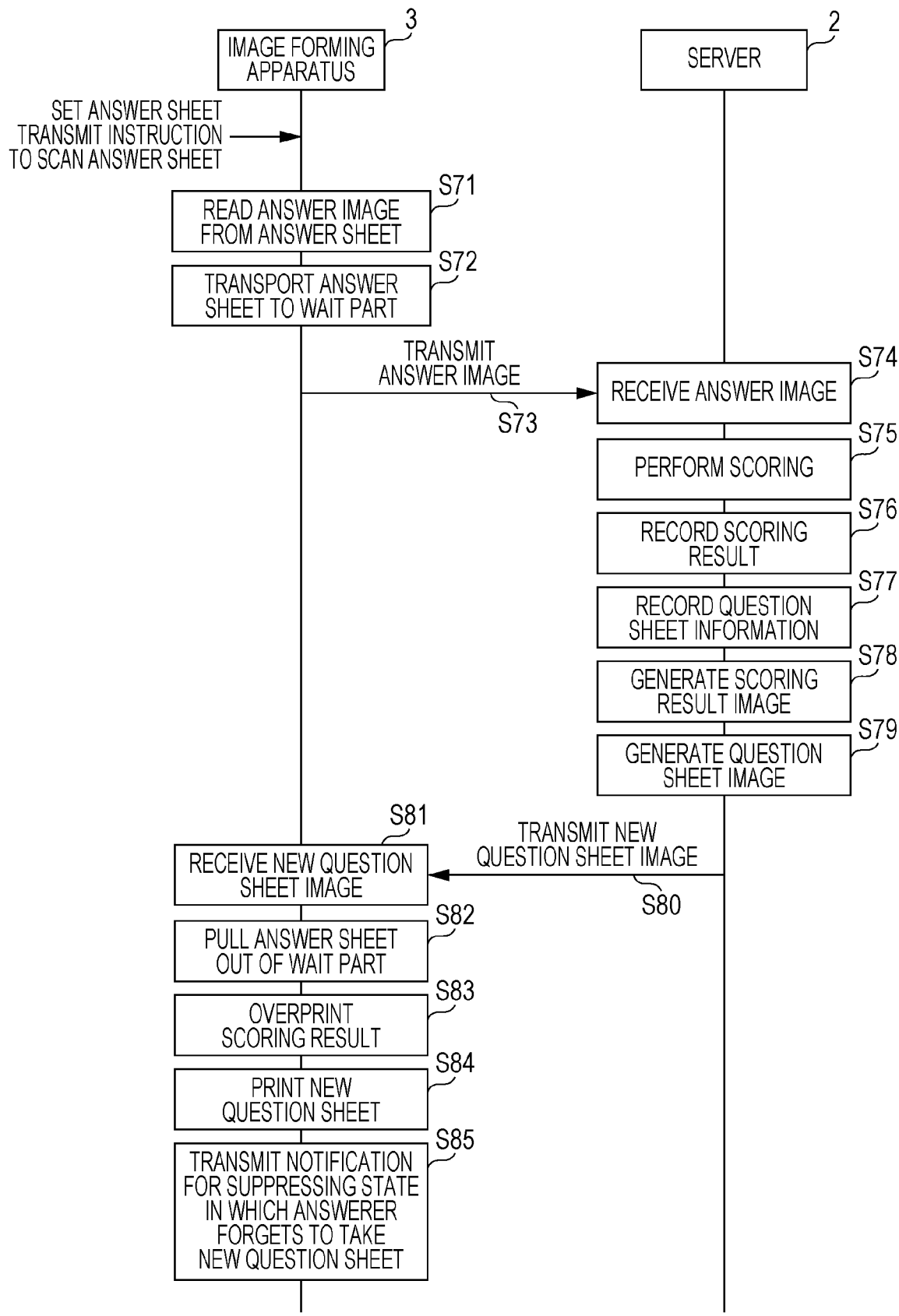

IMAGE FORMING APPARATUS AND NON-TRANSITORY COMPUTER READABLE MEDIUM FOR EJECTING FIRST SHEET WITH EVALUATION RESULT AND SECOND SHEET WITH INFORMATION BASED ON FIRST SHEET

CROSS-REFERENCE TO RELATED APPLICATIONS

This application is based on and claims priority under 35 USC 119 from Japanese Patent Application No. 2020-018912 filed Feb. 6, 2020.

BACKGROUND

(i) Technical Field

The present disclosure relates to an image forming apparatus and a non-transitory computer readable medium.

(ii) Related Art

In the related art, there has been proposed a question generation apparatus which generates questions in accordance with the status of a learner's correct/incorrect answers (for example, see Japanese Unexamined Patent Application Publication No. 2018-106082).

A question generation apparatus described in Japanese Unexamined Patent Application Publication No. 2018-106082 includes an image reading unit, a scoring processor, a question selection unit, and a question edit unit. The image reading unit reads an answer sheet, on which a learner's answers are written, and a correct answer sheet on which correct answers are displayed in advance, to generate answer data and correct answer data from the respective sheets. The scoring processor scores the answer data on the basis of the correct answer data, and determines the score. The question selection unit adjusts at least one of the number of questions and the degree of difficulty on the basis of the determined score. As the score is higher, the question selection unit selects questions whose degree of difficulty is higher. As the score is higher, the question selection unit selects a smaller number of questions. The question edit unit edits questions by using the at least one question which has been selected.

When a second sheet is output on the basis of the evaluation result of a first sheet obtained through reading, a user, who transmits an instruction to read the first sheet, may forget to take the second sheet.

SUMMARY

Aspects of non-limiting embodiments of the present disclosure relate to an image forming apparatus and a non-transitory computer readable medium which enable suppression of the state, in which a user forgets to take a second sheet, compared with the configuration in which a first sheet and the second sheet are not output continuously. The second sheet records first information determined on the basis of the evaluation result of the first sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a reader, a wait part, and a processor. The reader reads an image from a first sheet. In the wait part, the first sheet is made to wait. The processor is configured to make the first sheet wait in the wait part after the reading performed by the reader, and, after the first sheet is made to wait in the wait part, output the first sheet and a second sheet continuously. The second sheet records first information determined on the basis of an evaluation result obtained from evaluation of the first sheet.

BRIEF DESCRIPTION OF THE DRAWINGS

Exemplary embodiments of the present disclosure will be described in detail based on the following figures, wherein:

FIG. 11 is a sequence chart of exemplary operations of an image forming system.

DETAILED DESCRIPTION

Figure 1:
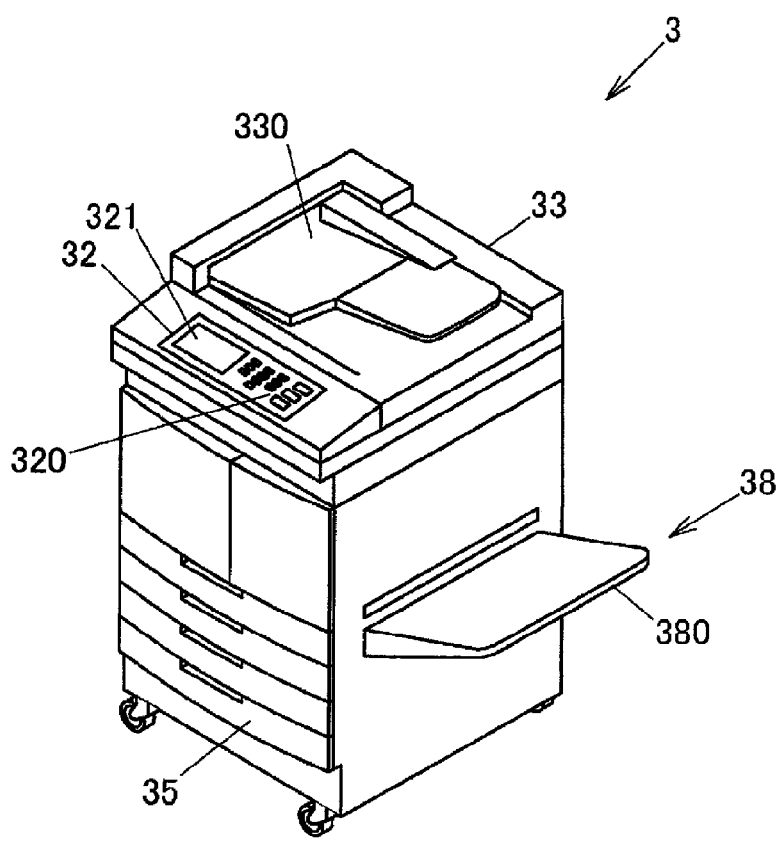
FIG. 1 is a diagram illustrating an exemplary configuration of an image forming apparatus according to a first exemplary embodiment of the present disclosure.

Exemplary embodiments of the present disclosure will be described below by referring to the drawings. In the figures, components having substantially the same functions are designated with the same reference numbers, and repeated description about such components will be suppressed.

Summary of Exemplary Embodiment

An image forming apparatus according to the present exemplary embodiment includes a reader, a wait part, and a processor. The reader reads an image from a first sheet. In the wait part, the first sheet is made to wait. The processor is configured to make the first sheet wait in the wait part after the reading performed by the reader, and, after the first sheet is made to wait in the wait part, output the first sheet and a second sheet continuously. The second sheet records first information determined on the basis of an evaluation result obtained from evaluation of the first sheet.

The "first sheet" indicates a sheet from which an image is to be read by using the reader of the image forming apparatus. The first sheet is a sheet which is to be evaluated. The "second sheet" indicates a sheet which is to be printed and output by an output unit of the image forming apparatus. The second sheet records the first information.

The "first information" is determined in accordance with the evaluation result obtained through evaluation of a first sheet. The first information includes the evaluation result itself. Specifically, the "first information" includes, for example, information, such as questions for learning and questions for a questionnaire, which requests answers from a user, and information, such as the result of diagnosis of a stress check, which is notified to a user.

Second information, which is to be evaluated, is recorded on a first sheet. The "second information" indicates information about answers written for the first information by a user.

The term, "continuously", indicates a state in which there is no different medium such as a sheet between two sheets, and in which two or more sheets are subsequently processed in a certain period (for example, several seconds). The term, "in a certain period", encompasses occurrence at the same time.

That is, the expression, "continuously output", encompasses, for example, the case in which two or more sheets are sequentially output, and the case in which two or more sheets are output collectively.

First Exemplary Embodiment

FIG. 1 is a diagram illustrating an exemplary configuration of an image forming apparatus according to a first exemplary embodiment of the present disclosure. An image forming apparatus 3 is, for example, a multifunction device having multiple functions of the scan function, the print function, the copy function, the fax function, the electronic mail function, the server function, and the like. The image forming apparatus 3 is not limited to a multifunction device. As long as the image forming apparatus 3 has at least the scan function and the print function, the image forming apparatus 3 may have any configuration. In most cases, the image forming apparatus 3 is applied, for example, to education, such as schools, classrooms, and after-hours cram schools. Especially, the image forming apparatus 3 may be applied to a learning system which provides questions whose degree of difficulty has been adjusted in accordance with the ability or level of a learner.

The Configuration of the Image Forming Apparatus 3

Figure 2:
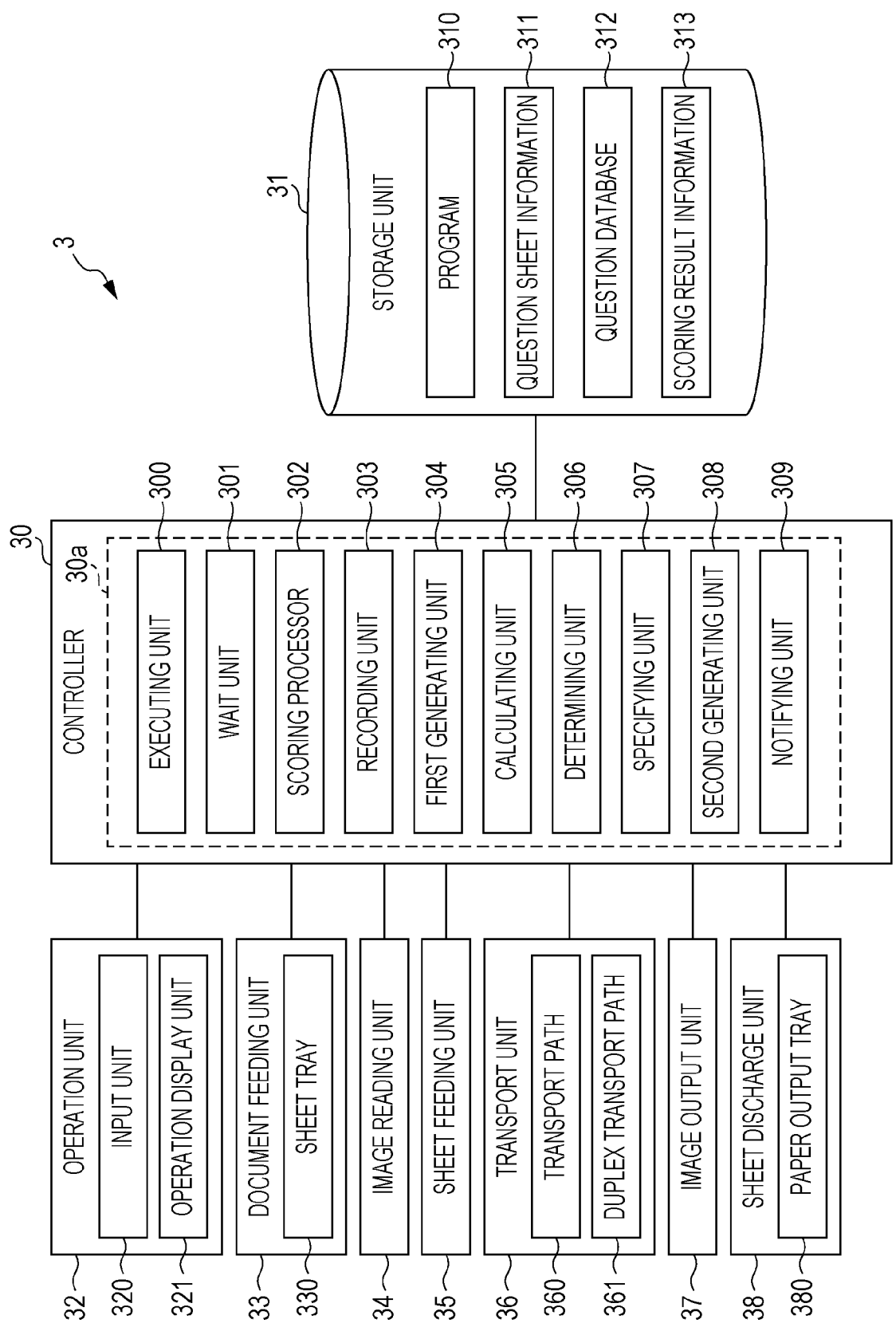
FIG. 2 is a block diagram illustrating an exemplary control system of an image forming apparatus.

FIG. 2 is a block diagram illustrating an exemplary control system of the image forming apparatus 3. As illustrated in FIG. 2, the image forming apparatus 3 includes a controller 30 which controls its units, a storage unit 31 which stores various types of data, an operation unit 32 which receives input of information and displays information, a document feeding unit 33 which feeds sheets to the document platen, an image reading unit 34 which reads images from sheets, a sheet feeding unit 35 which supplies sheets (hereinafter also referred to as "print sheets") used in printing, a transport unit 36 which transports sheets, an image output unit 37 which prints and outputs images, and a sheet discharge unit 38 which discharges sheets.

The image reading unit 34 is an exemplary reader. The image output unit 37 is an exemplary output unit. The image forming apparatus 3 may further include a fax communication unit which performs fax reception/transmission over a public network to facsimiles provided outside.

The controller 30 includes a processor 30a such as a central processing unit (CPU) and an interface. The processor 30a operates according to a program 310 stored in the storage unit 31, thus functioning as an executing unit 300, a wait unit 301, a scoring processor 302, a recording unit 303, a first generating unit 304, a calculating unit 305, a determining unit 306, a specifying unit 307, a second generating unit 308, a notifying unit 309, and the like. The units 300 to 309 will be described in detail below.

The storage unit 31, which includes a read only memory (ROM), a random access memory (RAM), and a hard disk, stores the program 310 and various types of data, such as question sheet information 311, a question database 312, and scoring result information 313.

The question sheet information 311 records information about a sheet (hereinafter also referred to as a "question sheet") on which all the answer fields are blank. An answerer is an exemplary user.

The question sheet information 311, for example, records the following information in association with a format ID for identifying the format of a question sheet.

(a) An image of the question sheet (hereinafter also referred to as a "question sheet image")

(b) Additional information for correcting the question sheet image (c) Information about each entry field Information indicating the type of the entry field
  Position information indicating the position of the entry field in the sheet
  Information indicating the entry system (for example, the narrative form or the selective form)
  Information indicating a character type that is used, etc.

Examples of the "type of an entry field" include the format-ID print field, the attribute field of an answerer (for example, the affiliation field of the answerer, such as the grade or the class, and the name field of the answerer), the score field, the question field in which a question statement is printed, the answer field, the quick response (QR™) field (for example, which may be used in scoring performed a second time).

The question database 312 records information about questions. The question database 312 records, for example, information about the following content.

(a) The target rank (hereinafter also referred to as the "grade" such as the grade of an answerer)

(b) The subject (c) The classification of questions (for example, the classification in accordance with the test scope such as questions about fractions)

(d) Correct answers, answer examples, and the like (e) The degree of difficulty

The scoring result information 313 records results of scoring on sheets (hereinafter also referred to as "answer sheets") on which answers have been written in answer fields. An answer is exemplary second information. An answer sheet is an exemplary first sheet.

The scoring result information 313 records, for example, information about the following content in association with the answerer ID for identifying an answerer and the format ID of a question sheet (which may be the question sheet ID for identifying a question sheet).

(a) The date and time at which the scoring was performed (b) The result of scoring (hereinafter also referred to as the "scoring result")

(c) An image of the answer sheet (hereinafter also referred to as an "answer image"), etc.

The "answer sheets" include a sheet (hereinafter also referred to as an "only-answer sheet") having only answer fields without written questions, and a sheet on which both questions fields and answer fields are written. Examples of a scoring result include information indicating whether or not each answer is correct, and information indicating the ability of the answerer. The details of the ability will be described below. A scoring result is an exemplary evaluation result.

The operation unit 32 includes an input unit 320 formed of operation buttons, and an operation display unit 321 which receives input of information and displays information. The operation display unit 321, which is, for example, a touch panel display, has a configuration in which a touch panel overlies a display such as a liquid-crystal display.

The document feeding unit 33 is formed, for example, of an auto document feeder (ADF), a dual auto document feeder (DADF), or the like. The document feeding unit 33 is disposed on the document platen. The document feeding unit 33 includes a sheet tray 330 such as an interposer tray in which sheets, which are to be read (hereinafter also referred to as "scanned"), are disposed (hereinafter also referred to as "set").

The image reading unit 34 reads images from sheets, and includes a scanner (not illustrated). The image reading unit 34 optically reads images from sheets, which are set on the document platen manually, or sheets which have been transported by the document feeding unit 33 to the read position of the document platen.

The sheet feeding unit 35 holds print sheets, and, in printing, supplies each print sheet, which is held, to the image output unit 37.

The transport unit 36 transports each print sheet which has been supplied (hereinafter also referred to as "fed") from the sheet feeding unit 35. The transport unit 36 includes a transport path 360 and a duplex transport path 361. The duplex transport path 361 has a function of, in duplex printing on the front side and the back side, causing a print sheet, which has been printed on one of the sides, to wait temporarily, and reversing the print sheet for preparation of printing on the other side. The duplex transport path 361 has such a size that multiple (for example, one) print sheets are made to wait. The duplex transport path 361 is an exemplary wait part.

The image output unit 37 prints color images or monochrome images on recording media such as sheets, for example, by using the electrophotographic system, the inkjet system, or the like. In the first exemplary embodiment, the image output unit 37 performs normal printing in which printing is performed on a print sheet which has not been printed, and performs "overprinting" in which further printing is performed on a print sheet on which the normal printing has been performed.

The sheet discharge unit 38 discharges sheets on which printing has been performed by the image output unit 37. The sheet discharge unit 38 includes a paper output tray 380 which holds discharged sheets. The paper output tray 380 is an exemplary wait part.

The sheet discharge unit 38 is not limited to one with a small capacity as illustrated in FIG. 1. For example, the sheet discharge unit 38 may have a form of an apparatus with a large capacity, such as a stacker tray, a finisher tray, a finisher paper output tray, or an external finisher.

The Units 300 to 309 of the Controller 30

The executing unit 300 performs various processes. Specifically, the executing unit 300 controls the document feeding unit 33 so that a sheet is transported to the read position of the document platen. The executing unit 300 controls the image reading unit 34 so that an image is read from a sheet. The executing unit 300 controls the sheet feeding unit 35 so that a print sheet is supplied; controls the transport unit 36 so that the print sheet is transported to the image output unit 37; and controls the image output unit 37 so that an image is printed on the print sheet. The executing unit 300 controls the sheet discharge unit 38 so that the print sheet is discharged to the paper output tray 380. The form of discharge of sheets will be described in detail below.

The wait unit 301 controls the transport unit 36 or the sheet discharge unit 38 so that a sheet, from which an image has been read, is transported to a wait part, and the sheet is made to wait in the wait part temporarily. As described above, for example, the duplex transport path 361 or the paper output tray 380 may be used as a wait part.

The scoring processor 302 extracts the answerer ID and the question sheet information 311 from an answer image obtained through reading by the image reading unit 34, and scores the answers, which are included in the answer image, by referring to the question database 312. Examples of scoring include determination about being correct/incorrect.

The recording unit 303 records the scoring result, which is obtained by the scoring processor 302, in the scoring result information 313 in the storage unit 31.

The first generating unit 304 generates an image (hereinafter referred to as a "scoring result image") of the scoring result. Accompanying information (hereinafter also referred to as "metadata") in accordance with the scoring result is added to the generated image. The scoring result image is used in overprinting.

The metadata includes, for example, the following information.

(a) Information indicating the print format (specifically, information indicating overprinting)
(b) Information indicating the number of sides
(c) Single-sided/double-sided information
(d) Page information (such as color information), etc.

The calculating unit 305 calculates the ability of the answerer in accordance with the scoring result. For example, the calculating unit 305 obtains the accuracy rate for each classification ID for identifying a question classification and for each degree of difficulty from the scoring result. The calculating unit 305 adjusts the accuracy rate by using, as a weight, the number of questions for each degree of difficulty. The calculating unit 305 calculates the degree of difficulty by using the accuracy rate as a weight. The calculating unit 305 obtains the calculation value as a value (hereinafter also referred to as an "ability value") indicating the ability of the answerer.

The calculating unit 305 adjusts the number of questions for each question classification ID and for each degree of difficulty in accordance with the ability value. For example, the calculating unit 305 adjusts the number of questions according to the normal distribution in which the ability value is set to the average.

The determining unit 306 determines whether or not a new question sheet is to be provided to the answerer. Specifically, the determining unit 306 determines whether or not a new question sheet is to be provided according to the following criteria. More specifically, if one of the following criteria is satisfied, the determining unit 306 determines that a new question sheet is to be provided to the answerer. If none of the criteria is satisfied, the determining unit 306 determines that a new question sheet is not to be provided to the answerer. A new question sheet is an exemplary second sheet. A criterion is an exemplary predetermined condition.

(a) A Criterion about Time

The case in which, at the time point at which an answer sheet is scanned, the remaining time of the lesson (or the test) is equal to or greater than a predetermined time. For example, this corresponds to the case in which it is determined that the answerer is able to answer new questions (hereinafter also referred to as "next questions") in the remaining time of the lesson (or the test). The "next questions" indicate exemplary first information.

(b) A Criterion about the Scoring Result

The case in which the scoring result indicates the maximum score

The case in which the degree of difficulty of questions for the answerer is equal to or greater than a predetermined reference value If the scoring result does not indicate the maximum score, only incorrect answers may be erased by using an eraser or the like, and the answerer may answer the questions a second time so that another scoring operation is performed. "The degree of difficulty of questions for an answerer" may be determined, for example, by comparing the degrees of difficulty, which serve as question attributes given to the questions themselves, with the ability value of the answerer.

(c) A Criterion about a Request from the Answerer

The case in which a specific field, which is provided in advance in the answer sheet, has been filled in. Examples of the specific field include a field in which information about whether or not next questions are desired is written, and a field in which the degree of difficulty is written.

When the determining unit 306 determines that a new question sheet is to be provided, the specifying unit 307 specifies the degree of difficulty of next questions written in a new output question sheet in accordance with the scoring result. That is, the "next questions" are determined on the basis of the evaluation result of the answers.

When the determining unit 306 determines that a new question sheet is to be provided, the second generating unit 308 refers to the question database 312, and generates a question sheet image of the new question sheet.

For example, the second generating unit 308 selects, from the question database 312, "next questions" for which the degree of difficulty, which is specified by the specifying unit 307, and the trend of the questions are adjusted. Thus, the second generating unit 308 generates, with metadata, a question sheet image of the "new question sheet" including the next questions.

The metadata added to a question sheet image includes, for example, the following information.
(a) Information indicating the print format (specifically, information indicating that it is not overprinting, that is, it is normal printing)
(b) Information indicating the number of sides
(c) Page information (such as single-sided/double-sided information, the sheet size, portrait/landscape orientation information, and color information), etc.

The second generating unit 308 may refer to the scoring result information 313 in the storage unit 31, and may generate a question sheet image of the new question sheet in further consideration of past scoring results. In addition, for example, when the determining unit 306 determines that the degree of difficulty of the questions for the answerer is equal to or greater than the predetermined reference value, the second generating unit 308 may generate a question sheet image including questions having a smaller degree of difficulty than the degree of difficulty of questions for the scored answer sheet.

When the new question sheet is output, the notifying unit 309 notifies the answerer of a message for suppressing the state in which the answerer forgets to take the new question sheet. For example, the notifying unit 309 transmits notification by displaying a message that a new question sheet is output, on the display screen of the operation display unit 321.

Forms of Discharge of Sheets

FIGS. 3A to 3D are diagrams which schematically illustrate exemplary forms of discharge of an answer sheet and a new question sheet. In FIGS. 3A to 3D, for the sake of description about the order of discharge of an answer sheet and a new question sheet, the sheets are illustrated so as to be shifted to each other slightly or to be rotated. It is to be noted that it is not necessary for the sheets to be actually shifted or rotated, and that the sheets are superposed on each other in top plan view.

Figure 3A:
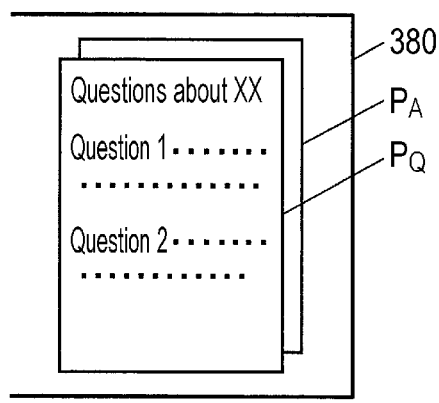
FIGS. 3A to 3D are diagrams which schematically illustrate exemplary forms of discharge of an answer sheet and a new question sheet.

As illustrated in FIG. 3A, the executing unit 300 may discharge an answer sheet $P_A$, on which the scoring result is overprinted, prior to a new question sheet $P_Q$. In other words, the new question sheet $P_Q$ may be discharged after the answer sheet $P_A$ on which the scoring result is overprinted. In this case, the new question sheet $P_Q$ is output continuously onto the answer sheet $P_A$ on which the scoring result is overprinted.

Figure 3B:
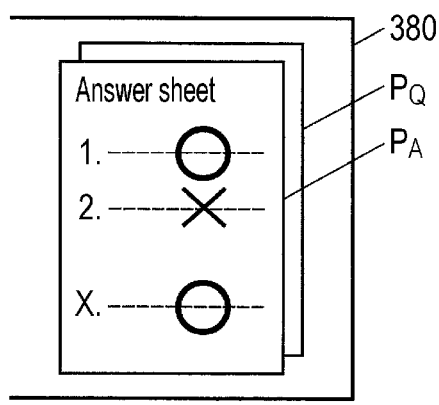

As illustrated in FIG. 3B, the executing unit 300 may discharge the new question sheet $P_Q$ prior to the answer sheet $P_A$ on which the scoring result is overprinted. In other words, the answer sheet $P_A$, on which the scoring result is overprinted, may be discharged after the new question sheet $P_Q$. In this case, the answer sheet $P_A$, on which the scoring result is overprinted, is output continuously onto the new question sheet $P_Q$. The new question sheet $P_Q$ is output prior to the answer sheet $P_A$, achieving suppression of the state in which a user forgets to take the question sheet $P_Q$.

Figure 3C:
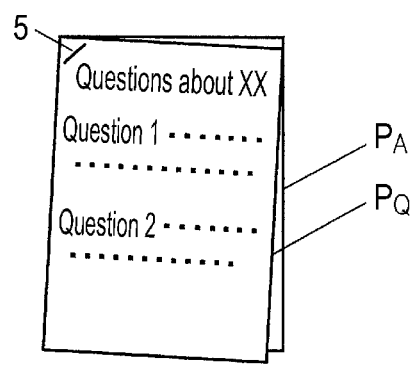
Figure 3D:
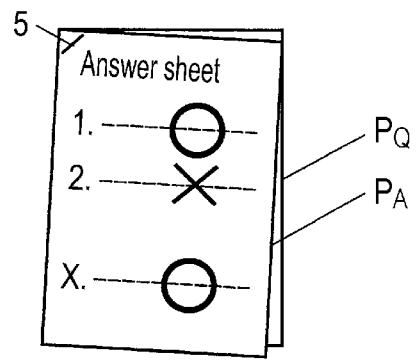

As illustrated in FIGS. 3C and 3D, the executing unit 300 may output the new question sheet $P_Q$ and the answer sheet $P_A$, on which the scoring result is overprinted, collectively. For example, the executing unit 300 may use a finisher (not illustrated) to output the answer sheet $P_A$, on which the scoring result is overprinted, and the new question sheet $P_Q$ which are stapled by using a binding member (hereinafter also referred to as a "staple") 5 or the like. The answer sheet $P_A$ and the new question sheet $P_Q$ are output collectively, achieving suppression of the state in which a user forgets to take the question sheet $P_Q$.

When the sheets are stapled, as illustrated in FIG. 3C, the new question sheet $P_Q$ may be put on the top, or, as illustrated in FIG. 3D, the answer sheet $P_A$, on which the scoring result is overprinted, may be put on the top.

When the order of execution of printing is different from the order of discharge, to change the order of discharge, a sheet, which has been printed earlier, may be made to wait, for example, in the duplex transport path 361.

Operations According to First Exemplary Embodiment

Figure 4:
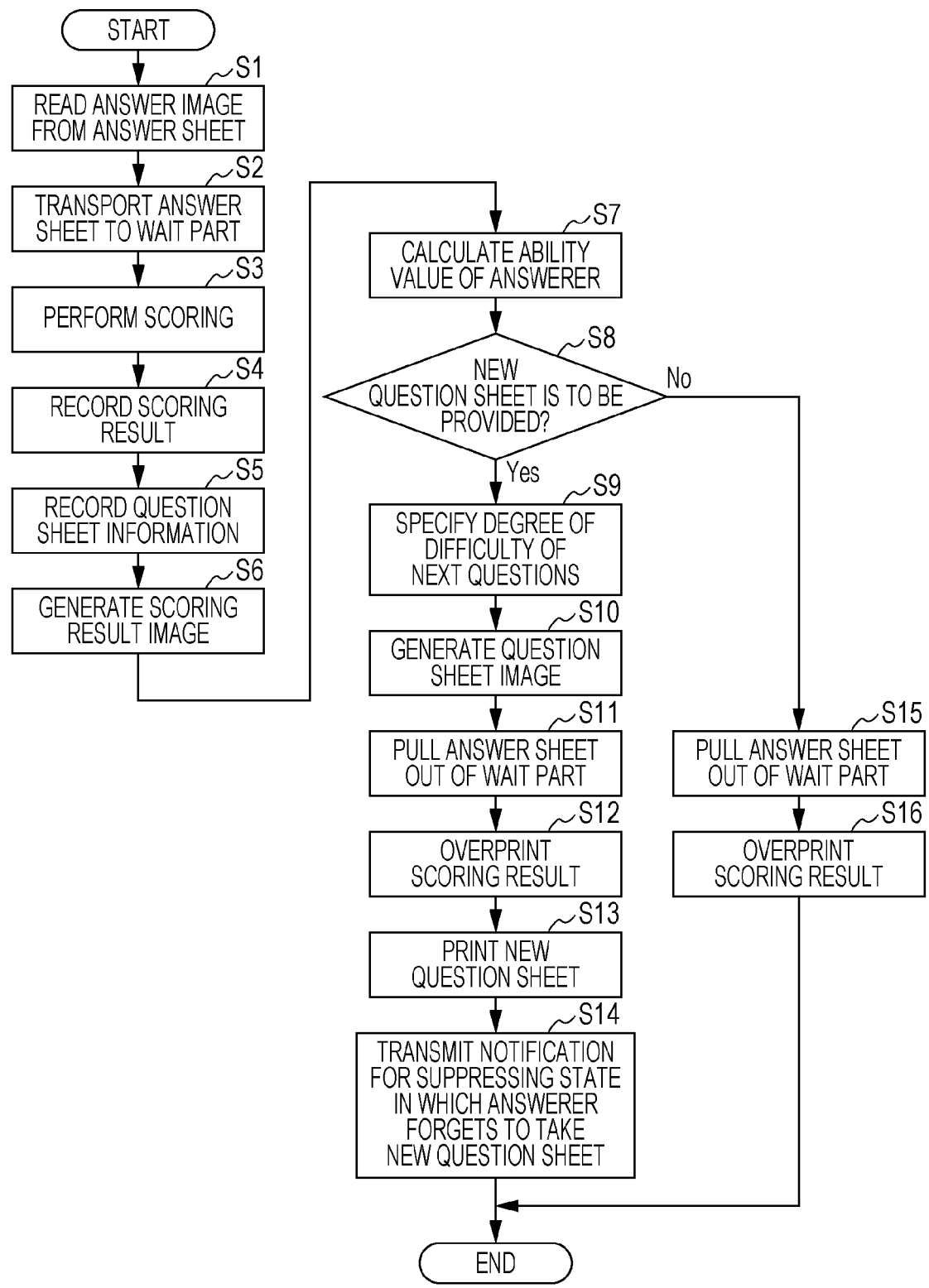
FIG. 4 is a flowchart of exemplary operations of an image forming apparatus according to the first exemplary embodiment.

FIG. 4 is a flowchart of exemplary operations of the image forming apparatus 3 according to the first exemplary embodiment. When an answerer sets an answer sheet on the document platen and transmits an instruction to scan the answer sheet, the executing unit 300 controls the image reading unit 34 so that an answer image is read from the answer sheet (S1). When the answerer sets the answer sheet on the sheet tray 330, the executing unit 300 controls the document feeding unit 33 so that the answer sheet is transported to the read position of the document platen, and controls the image reading unit 34 so that an answer image is read from the answer sheet.

The wait unit 301 transports the answer sheet to a wait part, such as the duplex transport path 361 or the paper output tray 380 (S2), and makes the answer sheet wait in the wait part temporarily.

The scoring processor 302 scores the answer image (S3). The recording unit 303 records the scoring result in the scoring result information 313 in the storage unit 31 (S4). The recording unit 303 records the question sheet information 311 (S5).

The first generating unit 304 generates a scoring result image for overprinting in accordance with the scoring result (S6).

The calculating unit 305 calculates the ability value of the answerer in accordance with the scoring result (S7). The determining unit 306 determines whether or not a new question sheet is to be provided to the answerer (S8).

If the determining unit 306 determines that a new question sheet is to be provided (Yes in S8), the specifying unit 307 specifies the degree of difficulty of next questions written in the new question sheet (S9). The second generating unit 308 selects questions having the degree of difficulty which is specified by the question database 312, and generates a question sheet image of the new question sheet (S10).

The executing unit 300 pulls the answer sheet, which is made to wait, out of the wait part (S11), and controls the image output unit 37 so that the scoring result image is overprinted on the answer sheet (S12). The executing unit 300 controls the sheet discharge unit 38 so that the answer sheet, on which the scoring result image has been overprinted, is discharged onto the paper output tray 380 again.

The executing unit 300 controls the image output unit 37 so that the question sheet image is printed (S13), and controls the sheet discharge unit 38 so that the question sheet is discharged onto the paper output tray 380. The notifying unit 309 transmits notification for suppressing the state in which the answerer forgets to take the new question sheet (S14).

If the determining unit 306 determines that a new question sheet is not to be provided (No in S8), the image forming apparatus 3 does not print a new question sheet, and performs only overprinting of the scoring result for output. Specifically, the executing unit 300 pulls the answer sheet, which has been made to wait in the wait part temporarily, out of the wait part (S15), and controls the image output unit 37 so that the scoring result image is overprinted on the answer sheet (S16).

If a new question sheet is not output, in step S2, in which the answer sheet is transported to the wait part for wait, may be skipped. In this case, the determination in step S8 may be performed between step S1 and step S2.

For the sake of description, the example, in which only one paper output tray 380 is provided, is described. Alternatively, two or more paper output trays 380 may be provided. In this case, any one of the paper output trays 380 may be used as a dedicated tray serving as a wait part, and sheets, which have been printed, may be discharged to the other paper output trays 380.

Modified Example

Figure 5:
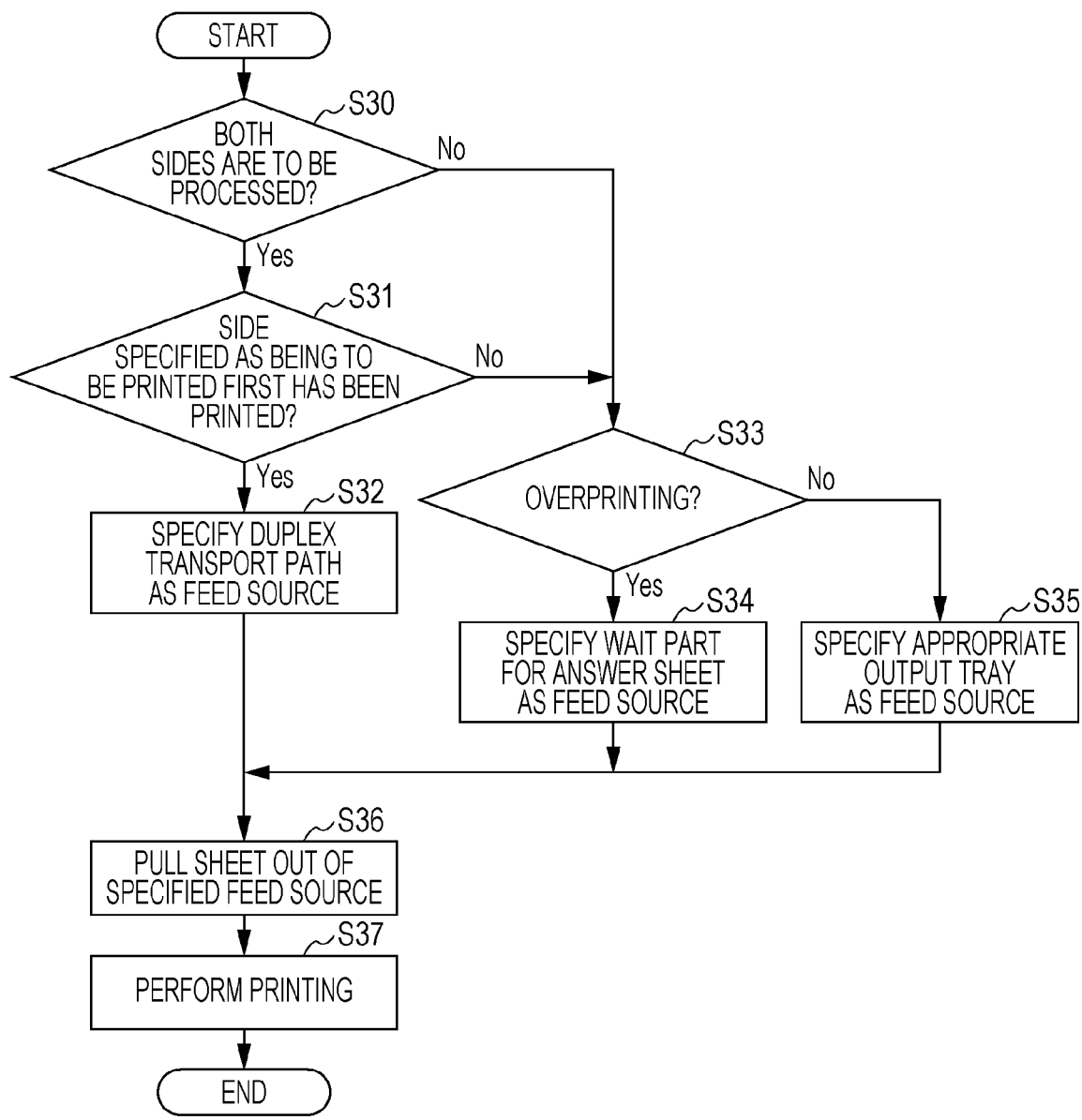
FIG. 5 is a flowchart of exemplary operations according to a modified example.

FIG. 5 is a flowchart of exemplary operations according to a modified example. The present disclosure may be applied to an answer sheet on which duplex printing has been performed. In the description below about operations, unless otherwise specified, the processor 30a provided in the controller 30 of the image forming apparatus 3 performs the operations, and the following processes are repeatedly performed for each output side.

If both the sides, the front side and the back side, are to be processed (Yes in S30), and if the side, which is specified as being to be printed first (for example, which is the front side, but which may be the back side), has been printed (Yes in S31), the duplex transport path 361 is set as a unit (hereinafter also referred to as a "feed source") which is to provide a sheet (S32).

If not both the sides, the front side and the back side, are to be processed (No in S30), or if the side, which is specified as being to be printed first, has not been printed (No in S31), and if overprinting is to be performed (Yes in S33), the wait part (for example, the paper output tray 380) for an answer sheet is specified as the feed source (S34).

If not both the sides, the front side and the back side, are to be processed (No in S30), or if the side, which is specified as being to be printed first, has not been printed (No in S31), and if overprinting is not to be performed (No in S33), that is, if normal printing is specified, an output tray (hereinafter also referred to as an "appropriate tray"), which is determined in accordance with the sheet size, the portrait/landscape orientation information, and the like of the output side, is specified as the feed source (S35).

A sheet is pulled out of the specified feed source (S36). Printing is performed on the pulled sheet (S37).

Second Exemplary Embodiment

Figure 6:
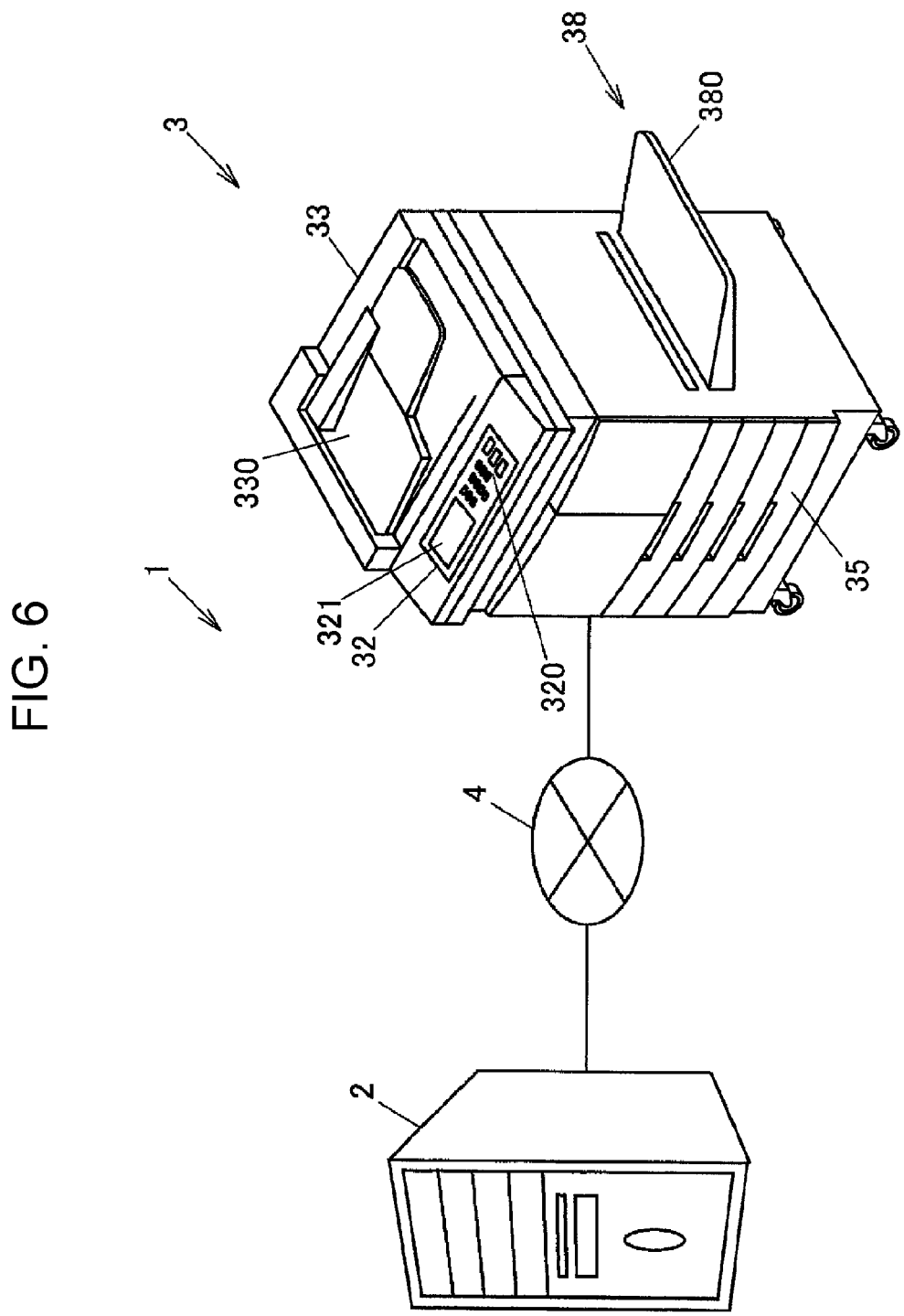
FIG. 6 is a diagram illustrating an exemplary configuration of an image forming system according to a second exemplary embodiment of the present disclosure.

FIG. 6 is a diagram illustrating an exemplary configuration of an image forming system according to a second exemplary embodiment of the present disclosure. The second exemplary embodiment is different from the first exemplary embodiment in that a server 2 is provided. Components having the same configurations and functions as those in the first exemplary embodiment are designated with the same reference numbers, and will not be described in detail. The points different from those in the first exemplary embodiment will be described mainly.

An image forming system 1 includes the server 2, the image forming apparatus 3, and a network 4 which communicatively connects the server 2 to the image forming apparatus 3. The image forming apparatus 3 may further include a terminal apparatus which controls the server 2 and the image forming apparatus 3. In most cases, the image forming system 1 is applied to education, such as schools, classrooms, and after-hours cram schools.

The server 2 is a scoring service apparatus having a function of scoring answer sheets, and is, for example, a digital front end (DFE) apparatus. The server 2 will be described in detail below. In the second exemplary embodiment, the image forming apparatus 3 does not necessarily have a server function.

The network 4 is, for example, a communication network, such as a local-area network (LAN), a wide-area network (WAN), the Internet, or an intranet, and may be wired or wireless.

The Configuration of the Server 2

Figure 7:
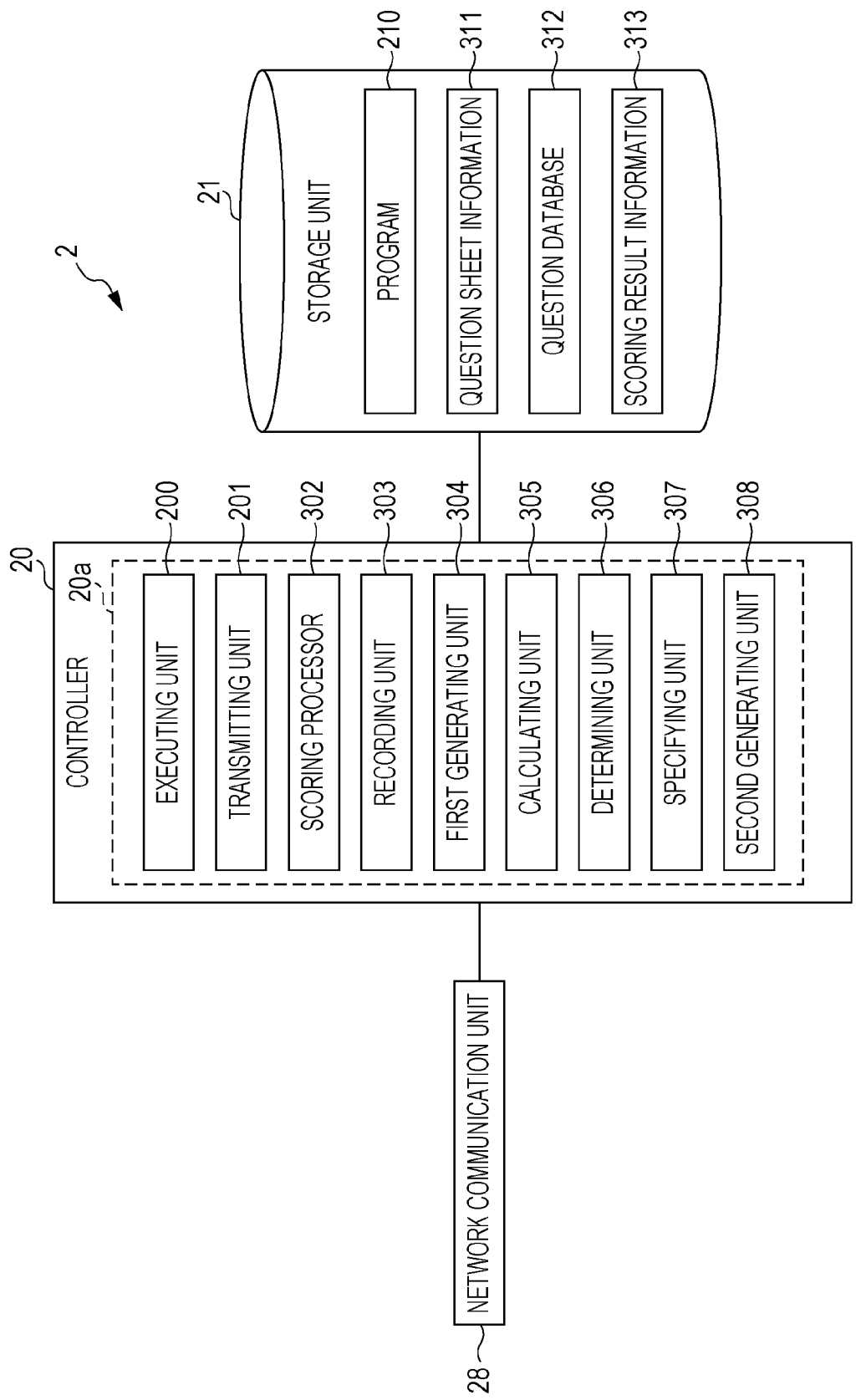
FIG. 7 is a block diagram illustrating an exemplary control system of a server.

FIG. 7 is a block diagram illustrating an exemplary control system of the server 2. The server 2 includes a controller 20 which controls its units, a storage unit 21 which stores various types of data, and a network communication unit 28 which communicates with the image forming apparatus 3 over the network 4.

The controller 20 includes a processor 20a such as a CPU and an interface. The processor 20a operates according to a program 210 stored in the storage unit 21, thus functioning as a receiving unit 200, a transmitting unit 201, the scoring processor 302, the recording unit 303, the first generating unit 304, the calculating unit 305, the determining unit 306, the specifying unit 307, the second generating unit 308, and the like.

The receiving unit 200 receives information and signals which are transmitted over the network 4 from external apparatuses such as the image forming apparatus 3. The transmitting unit 201 transmits information and signals over the network 4 to external apparatuses such as the image forming apparatus 3. The scoring processor 302, the recording unit 303, the first generating unit 304, the calculating unit 305, the determining unit 306, the specifying unit 307, and the second generating unit 308 have the same functions as those described in the first exemplary embodiment, and will not be described in detail.

The storage unit 21, which includes a ROM, a RAM, and a hard disk, stores the program 210 and various types of data, such as the question sheet information 311, the question database 312, and the scoring result information 313. The question sheet information 311, the question database 312, and the scoring result information 313 are the same as those described in the first exemplary embodiment, and will not be described in detail.

The network communication unit 28 receives/transmits signals from/to the image forming apparatus 3 over the network.

The Configuration of the Image Forming Apparatus 3

Figure 8:
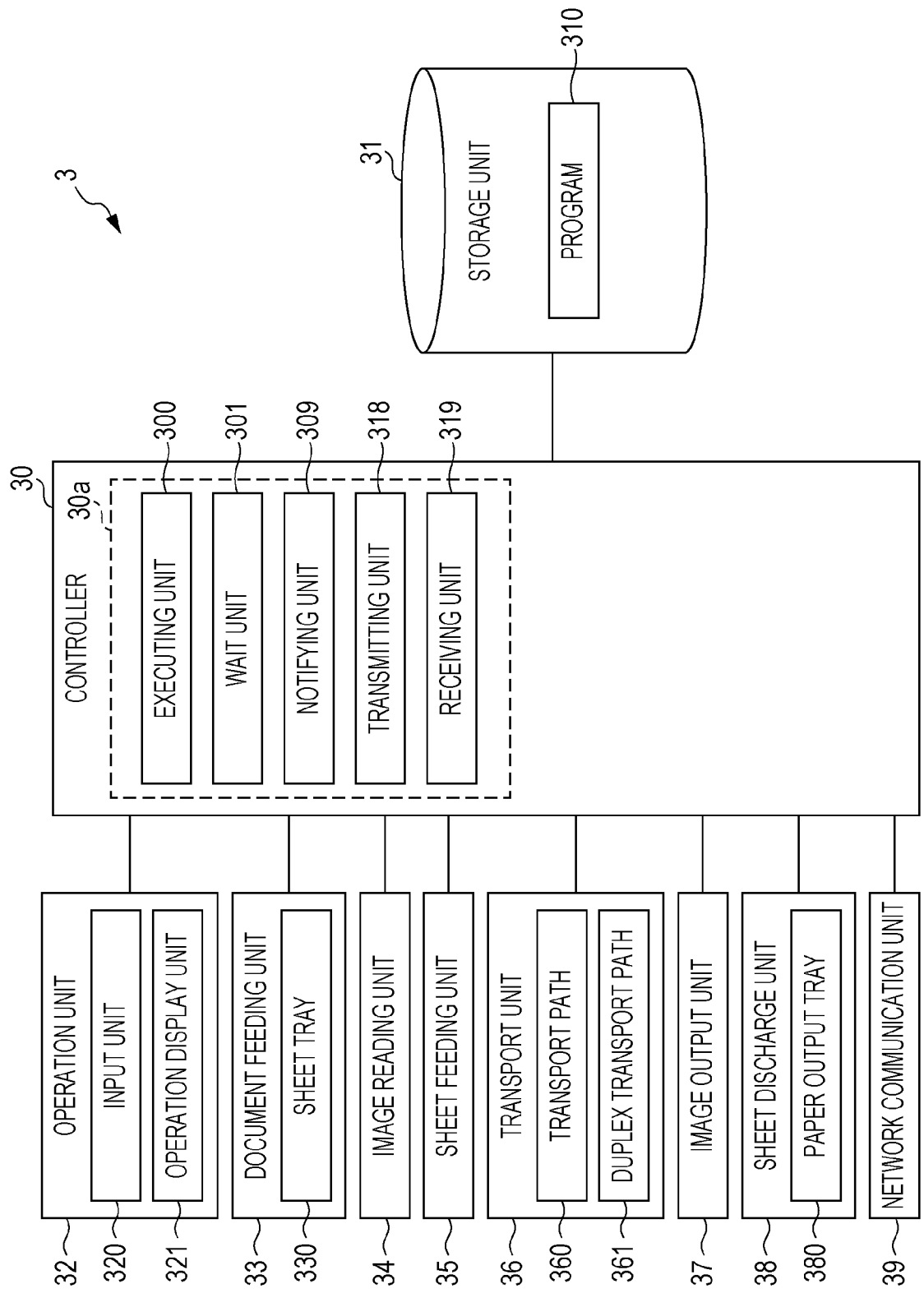
FIG. 8 is a block diagram illustrating an exemplary control system of an image forming apparatus.

FIG. 8 is a block diagram illustrating an exemplary control system of the image forming apparatus 3. The image forming apparatus 3 according to the second exemplary embodiment is different from the image forming apparatus 3 according to the first exemplary embodiment in that a transmitting unit 318 and a receiving unit 319 are further included in the controller 30. The controller 30 of the image forming apparatus 3 according to the second exemplary embodiment does not necessarily include the scoring processor 302, the recording unit 303, the first generating unit 304, the calculating unit 305, the determining unit 306, the specifying unit 307, and the second generating unit 308.

The processor 30a operates according to the program 310 stored in the storage unit 31, thus functioning as the executing unit 300, the wait unit 301, the transmitting unit 318, the receiving unit 319, and the like. The executing unit 300 and the wait unit 301 have the same functions as those described in the first exemplary embodiment, and will not be described in detail.

The receiving unit 319 receives information and signals which are transmitted over the network 4 from external apparatuses such as the server 2. The transmitting unit 318 transmits information and signals over the network 4 to external apparatuses such as the server 2.

The image forming apparatus 3 according to the second exemplary embodiment further includes a network communication unit 39 which is implemented by using a network interface card (NIC) or the like and which receives/transmits signals from/to external apparatuses over the network 4.

Operations According to Second Exemplary Embodiment

Exemplary operations of the image forming system 1 will be described by referring to FIGS. 9 to 11. Among the steps described in the first exemplary embodiment, the image forming apparatus 3 performs steps S1, S2, S11, S12, S13, S14, S15, and S16, and the server 2 performs the remaining steps S3 to S10. The description below will be made by classifying the operations into (1) operations of the image forming apparatus 3, (2) operations of the server 2, and (3) operations of the image forming system 1.

(1) Operations of the Image Forming Apparatus 3

Figure 9:
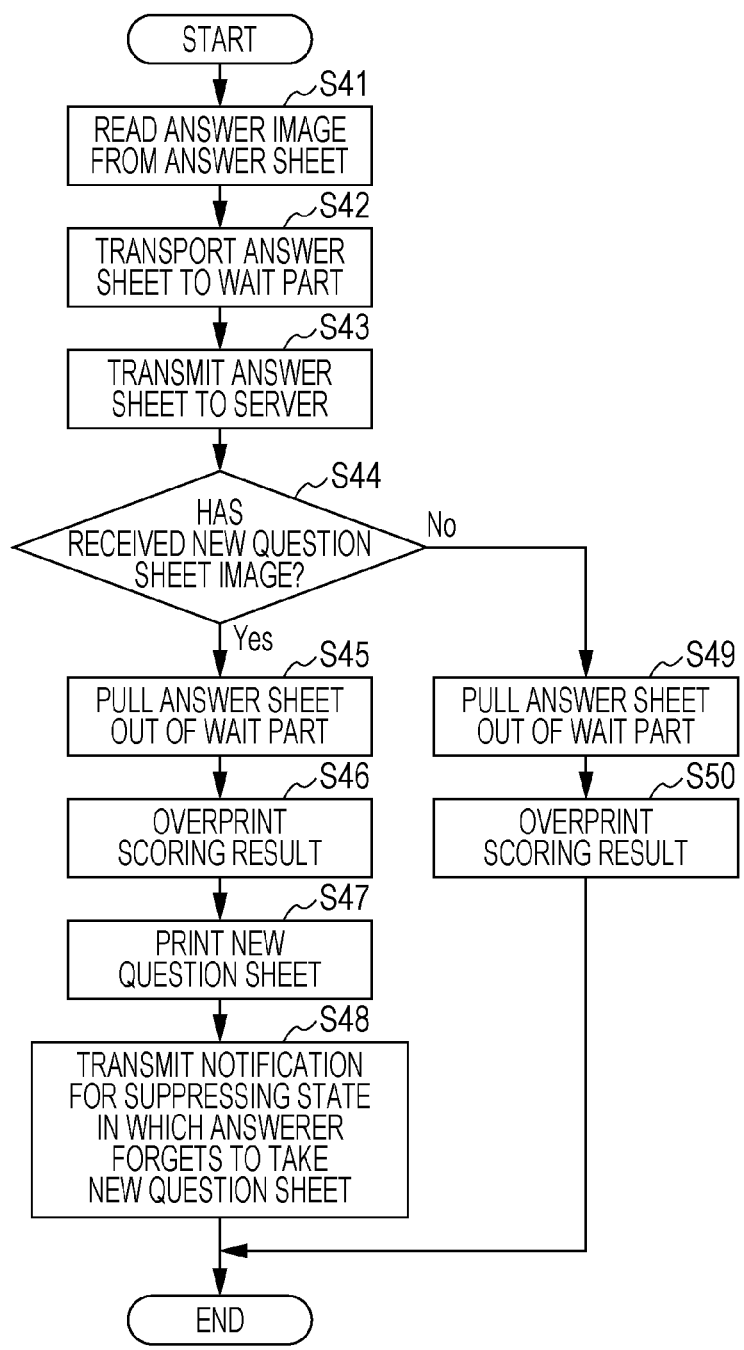
FIG. 9 is a flowchart of exemplary operations of an image forming apparatus.

FIG. 9 is a flowchart of exemplary operations of the image forming apparatus 3. In steps S41 and S42, operations substantially the same as those in steps S1 and S2 in the first exemplary embodiment are performed. That is, when an answerer sets an answer sheet on the document platen and transmits an instruction to scan the answer sheet, the executing unit 300 controls the image reading unit 34 so that an answer image is read from the answer sheet (S41), and the wait unit 301 transports the answer sheet to a wait part (S42), and causes the answer sheet to wait in the wait part temporarily.

The transmitting unit 318 transmits the answer image, which has been obtained through reading, over the network 4 to the server 2 (S43).

If the receiving unit 319 has received a new question sheet image transmitted from the server 2 (Yes in S44), in steps S45 to S48, operations, which are substantially the same as those in steps S11 to S14 in the first exemplary embodiment, are performed. That is, the executing unit 300 pulls the waiting answer sheet out of the wait part (S45), overprints a scoring result image on the answer sheet (S46), discharges the answer sheet, on which the scoring result image has been overprinted, to the paper output tray 380, prints the question sheet image (S47), and discharges the question sheet to the paper output tray 380. The notifying unit 309 transmits notification for suppressing the state in which the answerer forgets to take the new question sheet (S48).

If the receiving unit 319 has not received a new question sheet image transmitted from the server 2 (No in S44), the executing unit 300 pulls the waiting answer sheet out of the wait part (S49), and controls the image output unit 37 so that the scoring result image is overprinted on the answer sheet (S50).

The expression, "if the receiving unit 319 has not received a new question sheet image transmitted from the server 2", encompasses, for example, the case in which a new question sheet image is not transmitted from the server 2 in a predetermined period, and the case in which information indicating that a new question sheet is not provided has been received from the server 2.

(2) Operations of the Server 2

Figure 10:
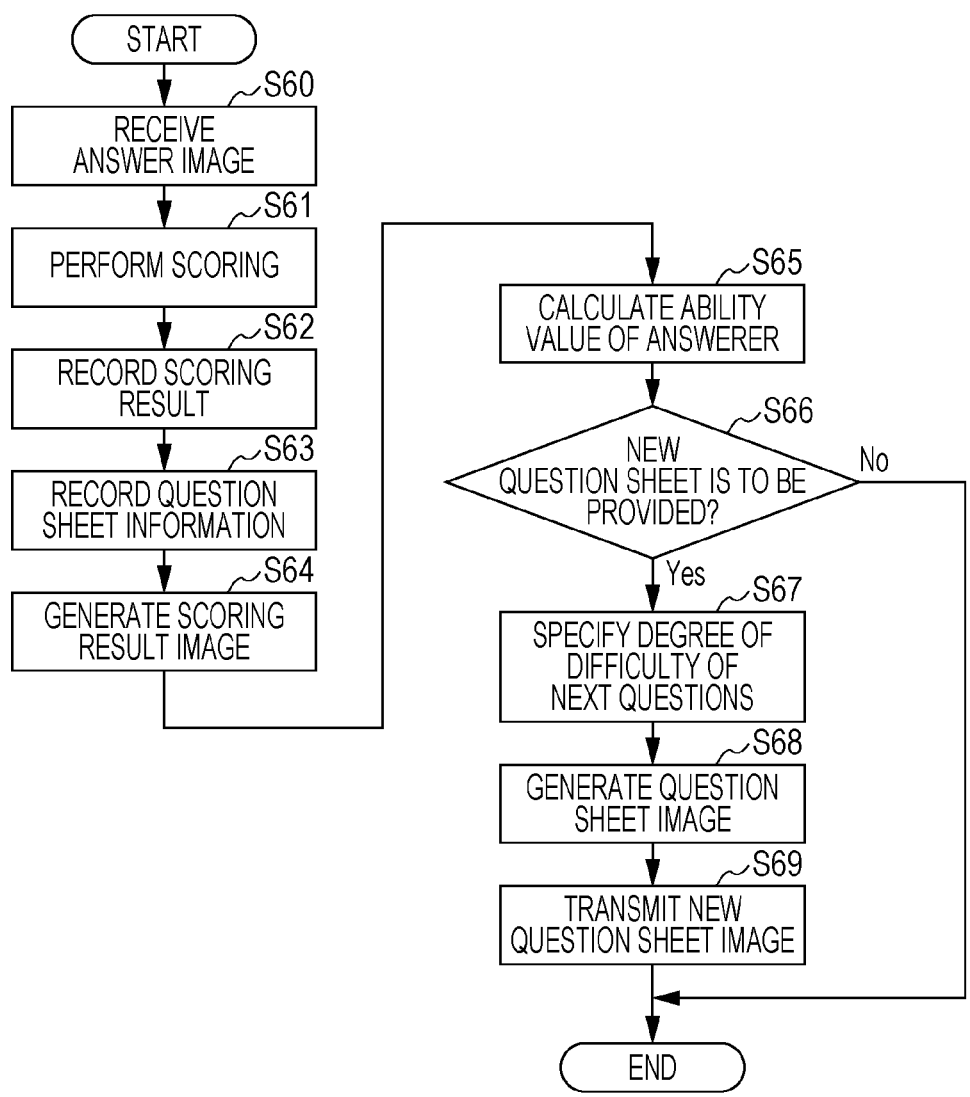
FIG. 10 is a flowchart of exemplary operations of a server.

FIG. 10 is a flowchart of exemplary operations of the server 2. The receiving unit 200 receives an answer image transmitted from the image forming apparatus 3 (S60). In steps S61 to S68, operations similar to those in steps S3 to S10 described in the first exemplary embodiment are performed.

That is, the scoring processor 302 scores the received answer image (S61); the recording unit 303 records the scoring result in the scoring result information 313 in the storage unit 21 (S62), and records the question sheet information 311 (S63); the first generating unit 304 generates a scoring result image for overprinting in accordance with the scoring result (S64); the calculating unit 305 calculates the ability value of the answerer (S65); the determining unit 306 determines whether or not a new question sheet is to be provided (S66).

If the determining unit 306 determines that a new question sheet is to be provided (Yes in S66), the specifying unit 307 specifies the degree of difficulty of next questions (S67), and the second generating unit 308 generates a question sheet image of the new question sheet (S68).

The transmitting unit 201 transmits the scoring result image and the question sheet image to the image forming apparatus 3 (S69). If a new question sheet image is not transmitted, the transmitting unit 201 may transmit information indicating that a new question sheet is not to be provided.

(3) Operations of the Image Forming System 1

FIG. 11 is a sequence chart of exemplary operations of the image forming system 1. For the sake of description, FIG. 11 illustrates only the flow in which the determination results of "Yes" are selected at the branches in the operations of the server 2 and the image forming apparatus 3.

When an answerer sets an answer sheet to the document platen or the sheet tray 330 of the image forming apparatus 3 and transmits an instruction to scan the answer sheet, the executing unit 300 of the image forming apparatus 3 reads an answer image from the answer sheet (S71), and transports the answer sheet to a wait part for wait (S72). The transmitting unit 318 of the image forming apparatus 3 transmits the answer image to the server 2 (S73).

The receiving unit 200 of the server 2 receives the answer image (S74). The scoring processor 302 of the server 2 performs scoring (S75). The recording unit 303 of the server 2 records the scoring result (S76), and records the question sheet information (S77).

The first generating unit 304 of the server 2 generates a scoring result image (S78). The second generating unit 308 of the server 2 generates a question sheet image of a new question sheet (S79). The transmitting unit 201 of the server 2 transmits the new question sheet image to the image forming apparatus 3 (S80).

The receiving unit 319 of the image forming apparatus 3 receives the new question sheet image (S81). The executing unit 300 of the image forming apparatus 3 pulls the waiting answer sheet out of the wait part (S82), and performs overprinting of the scoring result (S83). The executing unit 300 of the image forming apparatus 3 prints a new question sheet (S84), and discharges the new question sheet to the discharge destination such as the paper output tray 380. The notifying unit 309 of the image forming apparatus 3 transmits notification for suppressing the state in which the answerer forgets to take the new question sheet (S85).

The exemplary embodiments of the present disclosure are described. The exemplary embodiment of the present disclosure is not limited to the exemplary embodiments described above. Various changes may be made without departing from the gist of the present disclosure. For example, the image forming system 1 and the image forming apparatus 3 are not necessarily applied to education. For example, the image forming system 1 and the image forming apparatus 3 may be applied to physical checkups performed in hospitals, clinics, public health centers, or the like.

Specifically, the image forming system 1 and the image forming apparatus 3 may be used for questionnaires such as a stress check. More specifically, the image forming system 1 and the image forming apparatus 3 may check, for diagnosis, answers written by an answerer on a questionnaire sheet, and may output a result sheet on which a diagnosis result is printed. A questionnaire sheet is an exemplary first sheet. A result sheet is an exemplary second sheet. A diagnosis result is exemplary first information and an exemplary evaluation result. An answer is exemplary second information. An answerer is an exemplary user.

A part or the entirety of each of the units of the controllers 20 and 30 may be formed of a hardware circuit, such as a field programmable gate array (FPGA) or an application specific integrated circuit (ASIC).

A subset of the components according to the exemplary embodiments may be omitted or changed. In the flows according to the exemplary embodiments, steps may be, for example, added, deleted, changed, or replaced without departing from the gist of the present disclosure. The programs used in the exemplary embodiments may be provided by storing the programs in a computer-readable recording medium such as a compact disc-read-only memory (CD-ROM), or may be stored in an external server such as a cloud server so as to be used over a network.

In the embodiments above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

What is claimed is:

1. An image forming apparatus comprising:
   a reader that reads an image from a first sheet;
   a wait part in which the first sheet is made to wait; and
   a processor,
   wherein the processor is configured to
      make the first sheet wait in the wait part after the reading performed by the reader,
      determine first information based on an evaluation result obtained from evaluating information included in the image,
      cause the first information to be recorded on a second sheet, and
      after the first sheet is made to wait in the wait part, pull the first sheet, attach the evaluation result to the first sheet, and output the first sheet and the second sheet continuously.

2. The image forming apparatus according to claim 1, wherein the processor is configured to output the second sheet when a predetermined condition is satisfied.

3. The image forming apparatus according to claim 2, wherein the processor is configured to output the second sheet when the predetermined condition is satisfied, the predetermined condition being that the evaluation result satisfies a predetermined criterion.

4. The image forming apparatus according to claim 3, wherein the processor is configured to output the second sheet prior to the first sheet.

5. The image forming apparatus according to claim 3, wherein the processor is configured to output the first sheet and the second sheet simultaneously.

6. The image forming apparatus according to claim 2, wherein the processor is configured to output the second sheet prior to the first sheet.

7. The image forming apparatus according to claim 2, wherein the processor is configured to output the first sheet and the second sheet simultaneously.

8. The image forming apparatus according to claim 1, wherein the processor is configured to output the second sheet prior to the first sheet.

9. The image forming apparatus according to claim 1, wherein the processor is configured to output the first sheet and the second sheet simultaneously.

10. The image forming apparatus according to claim 9, wherein the processor is configured to output the first sheet and the second sheet collectively.

11. A non-transitory computer readable medium storing a program causing a processor to execute a process, the processor controlling a reader and a wait part, the reader reading an image from a first sheet, the wait part being a part in which the first sheet is made to wait, the process comprising:

making the first sheet wait in the wait part after the reading performed by the reader;
determining first information based on an evaluation result obtained from evaluating information included in the image;
causing the first information to be recorded on a second sheet; and
after the first sheet is made to wait in the wait part, pulling the first sheet, attaching the evaluation result to the first sheet, and outputting the first sheet and the second sheet continuously.

* * * * *